United States Patent
Vieira et al.

(10) Patent No.: US 10,266,781 B2
(45) Date of Patent: Apr. 23, 2019

(54) PROCESS FOR PURIFYING BIODIESEL

(71) Applicant: PETROLEO BRASILEIRO S.A.—PETROBRAS, Rio de Janeiro, RJ (BR)

(72) Inventors: Jose Antonio Vidal Vieira, Rio de Janeiro (BR); Vitor Loureiro Ximenes, Rio de Janeiro (BR); Carolina Ludwig Quintani, Rio de Janeiro (BR); Marcio De Figueiredo Portilho, Rio de Janeiro (BR); Roberto Ricardo Rangel, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 15/723,361

(22) Filed: Oct. 3, 2017

(65) Prior Publication Data
US 2018/0094201 A1   Apr. 5, 2018

(30) Foreign Application Priority Data

Oct. 4, 2016   (BR) .......................... 10 2016 023104

(51) Int. Cl.
| | | |
|---|---|---|
| *C10L 1/02* | (2006.01) | |
| *C11B 3/00* | (2006.01) | |
| *B01D 12/00* | (2006.01) | |
| *B01D 17/02* | (2006.01) | |
| *B01D 11/04* | (2006.01) | |
| *C11C 3/00* | (2006.01) | |

(52) U.S. Cl.
CPC .......... *C10L 1/026* (2013.01); *B01D 11/0446* (2013.01); *B01D 12/00* (2013.01);
(Continued)

(58) Field of Classification Search
CPC ...... C11B 3/001; C11B 3/008; C10L 2290/08; C10L 2290/545; C10L 2290/547; C11C 1/08
See application file for complete search history.

(56) References Cited

U.S. PATENT DOCUMENTS 7,452,515 B1 * 11/2008 Lafleur ...................... B01J 4/00
                                                         422/224
2009/0293346 A1 * 12/2009 Birdwell, Jr. ............ B01J 14/00
                                                         44/308

(Continued)

FOREIGN PATENT DOCUMENTS

| CN | 103773416 | * 10/2012 | ............... C10G 3/00 |
| WO | 2007/076163 A2 | 7/2007 | |
| WO | WO 2016/098025 | * 6/2016 | ............. C07C 67/58 |

OTHER PUBLICATIONS

CN 103773416; Tian, Y., Preparation of rapeseed biodiesel involves crushing rapeseed, extracting adding specified amount of methanol and catalyst, heating, processing, centrifuging, washing obtained product using distilled water and separating, 2012, English translation, 5 pages (Year: 2012).*

(Continued)

*Primary Examiner* — Yate' K Cutliff
(74) *Attorney, Agent, or Firm* — Sughrue Mion, PLLC

(57) ABSTRACT

The present invention describes a process for purifying biodiesel without using a filter aid, in which purification of the biodiesel takes place by a sequence of washing operations after the reaction section, with stirring that is sufficiently vigorous to assist in the transformation of the molecules of esterified steryl glycosides, in order to convert them to a chemical form that can be removed by the process.

13 Claims, 4 Drawing Sheets

(52) U.S. Cl.
CPC .......... *B01D 17/0208* (2013.01); *C11B 3/008*
(2013.01); *B01D 11/0488* (2013.01); *C10L 2200/0476* (2013.01); *C10L 2290/08* (2013.01); *C10L 2290/10* (2013.01); *C10L 2290/146* (2013.01); *C10L 2290/24* (2013.01); *C10L 2290/545* (2013.01); *C10L 2290/547* (2013.01); *C11C 3/003* (2013.01); *Y02E 50/13* (2013.01)

(56) References Cited

U.S. PATENT DOCUMENTS

2010/0257777 A1* 10/2010 Sanchez-Riera ........ C10L 1/026
44/388
2011/0252397 A1 10/2011 Hong et al.
2011/0252697 A1* 10/2011 Boensch .................. C11C 1/08
44/388
2013/0012732 A1 1/2013 Seidel et al.

OTHER PUBLICATIONS

He, H.Y., et al, Comparison of Membrane Extractionwith Traditional Extraction Methods for Biodiesel Production, 2006, Journal of the American Oil Chemists' Society, vol. 83, No. 5, pp, 457-460 (Year: 2006).*

Atadashi, I.M., et al., Refining technologies for the refining of crude biodiesel, 2011, Applied Energy, vol. 88, pp. 4239-4251 (Year: 2011).*

WO 2016/098025; Mendow, G. et al., Process for the purification of biodiesel, Jun. 23, 2016, English translation, 11 pages (Year: 2016).*

* cited by examiner

PROCESS FOR PURIFYING BIODIESEL

CROSS-REFERENCE TO RELATED APPLICATION

This application claims the benefit of priority to BR 10 2016 023104-3, filed 4 Oct. 2016, which is incorporated herein by reference in its entirety.

FIELD OF THE INVENTION

The present invention relates to a process for purifying biodiesel in the absence of a filter aid. More specifically, the present invention suggests the purification of biodiesel using a sequence of washing operations after the reaction section, with stirring that is sufficiently vigorous to assist in the transformation of the molecules of esterified steryl glycosides, in order to convert them to a chemical form that can be removed by the process now claimed.

BACKGROUND OF THE INVENTION

Biodiesel obtained from oils of vegetable origin (for example soya oil and palm oil) has solid particles that arose from the metabolism of the plants from which it originated. These particles are observed even up to temperatures above the cloud point of biodiesel obtained from soya oil and palm oil, a phenomenon that is characterized by the appearance of tiny solid particles in suspension, leading to the formation of a cloud and a consequent increase in the turbidity of the biodiesel generated. With the passage of time, and when at rest, sedimentation of these particles promotes the formation of a layer of insoluble material at the bottom of the tank or where the biodiesel is stored.

The solid material observed in biodiesel consists of a mixture of compounds identified as comprising monoglycerides and steryl glycosides, which are primarily in the form of esterified steryl glycosides. When isolated, the steryl glycosides are in the form of a white powder, with a melting point between 240° C. and 290° C. and having reduced solubility in the majority of organic solvents, with the exception of pyridine and chloroform/methanol mixture (2:1).

Owing to the insolubility of the steryl glycosides in biodiesel, they become solid particles that are dispersed in the product, which influence the crystallization of other components in the product. It is thus necessary to purify the biodiesel obtained.

The set of equipment used in the steps associated with the purification of the product, to define it as biodiesel, is called the purification section. In this section, the light stream, rich in methyl and/or ethyl esters, received from a transesterification section, may be purified by techniques that can be divided into two main groups, known as wet washing and dry washing. The techniques belonging to the two groups have advantages and disadvantages and therefore selection of the most suitable method must basically comply with the criteria of product quality and process economy. Some techniques also possess the particular feature of having a hybrid character, i.e. they use both liquid fluids and adsorbent solid materials, combining them in different steps in order to meet the predetermined criteria.

In the dry purification of biodiesel, the light phase, received from the reaction section, only passes through columns with adsorbents, or through beds of ion-exchange resin, which provide removal of residual glycerol, traces of methanol and water present in the biodiesel, as well as soap, catalyst and salts. It is necessary to regenerate the adsorbents/resins and dispose of them when it is no longer possible to regenerate them. There are various suppliers of products for refining biodiesel by adsorption, each with their own technology and recommendations, such as LanXess, Rohm & Haas and Purolite.

On the other hand, the main technologies for purification of biodiesel in use in industrial units involve treatments with adsorbent materials, and may still require washing operations with water upstream of the step in which adsorption takes place. In all the technologies that employ washing of biodiesel with water, there is the option of using a subsequent refining step with filtration on a plate filter using a filter aid (for example diatomaceous earth), or using filtration systems consisting of self-cleaning filters and/or cartridge filters (high-flow cartridges and cartridges with adsorbent material). That is, in the purification of biodiesel the removal of water soluble contaminants is traditionally accomplished by water-washing the biodiesel. Another process of biodiesel purification involves the use of an "adsorbent filter-aid" such as magnesium silicate, and in the case of polar impurities it is usual to use a diatomaceous filter. The technology from Crown Technologies, for example, has two washing steps with water, followed by filtration on a plate filter, already containing a precoat, using diatomaceous earth as filter aid. However, this technology increases the cost of production and brings operational difficulties relating to the handling of solids, sometimes containing flammable substances, in the production unit.

Therefore, development of a process that dispenses with the use of a filter aid brings benefits in more than one aspect for the biodiesel plants.

In this connection, document US2011/0252397 relates to a process for obtaining biodiesel from fats, oils or fatty acids containing steryl glycosides. In this process, raw material is reacted by transesterification or esterification with short-chain alkanols in the presence of a catalyst, generating a fatty acid alkyl ester in a first product stream. Said first product stream is washed with water in a washing device, so as to form a layer of suspension at a phase boundary layer between a water-rich heavy phase and a first light phase rich in fatty acid alkyl ester. The layer of suspension is treated by stirring. A second product stream is withdrawn from the first light phase and mixed intensively with water to obtain a third product stream. Centrifugation is carried out on the third product stream to supply a fourth product stream and a fifth product stream. The fifth product stream is withdrawn as a heavy phase that is enriched with steryl glycosides. Product conditioning is carried out on the fourth product stream to obtain biodiesel that meets the specifications. In preferred embodiments, washing with water is carried out in countercurrent in a washing column. Product conditioning preferably comprises drying or filtration or both.

On the other hand, document US2013/0012732 describes a method for reprocessing a phase consisting substantially of steryl glycerides/fatty acid alkyl ester/water agglomerates, said phase being formed when fatty acid alkyl ester generated by the transesterification of vegetable oils or animal fats was washed with water, wherein the water content is evaporated by heating the phase and, subsequently, the steryl glycosides are split into their sterol and sugar fractions in the presence of an acid catalyst, both by adding a strong anhydrous acid and by contact with an acidic solid ion exchanger.

Moreover, document WO2007/076163 relates to processes for producing and treating biodiesel. This document proposes addition of an adsorbent or filter aid for separating steryl glycosides from the biodiesel and subsequent removal thereof by filtration, centrifugation or a combination thereof.

Thus, it can be seen that there are no documents in the prior art that disclose processes that purify biodiesel by a wet route without the need to use filter aids.

SUMMARY OF THE INVENTION

The present disclosure relates to a process for purifying biodiesel, in conditions in which the molecules of esterified steryl glycosides are transformed, in order to convert them to a chemical form that can be removed by the process now described.

A first aim is to improve the quality of the biodiesel generated from oils of vegetable origin (for example, soya oil and palm oil), which has solid particles arising from the metabolism of the plants from which it originates.

A second aim is to reduce the costs relating to the purification of crude biodiesel by eliminating the process of acquisition and disposal of filter aids, thus eliminating the risks associated with the handling of solids containing flammable material and reducing the generation of solid residues.

In order to achieve the aims described above, the present disclosure proposes a process for purifying biodiesel, comprising some or all of the following steps: a) operations of washing of a stream of biodiesel followed by decanting; and b) filtration of a light phase resulting from a decanting operation, wherein the filtration is carried out in the absence of filter aids. The filtration can be carried out after the decanting operation and before any further additives are added to the light phase resulting from the decanting operation.

Also proposed is a process for purifying biodiesel, comprising some or all of the following steps: a) addition of a stream of dilute acid to a stream of biodiesel; b) an operation of washing of the stream of biodiesel followed by a first decanting operation, and further taking the light phase resulting from the first decanting operation and performing further washing and decanting operations; c) collecting dense phases resulting from the decanting operations, and recycling at least one dense phase to one of the washing operations; d) drying of the light phase resulting a final decanting operation; e) cooling of the light phase resulting from the drying step; f) filtration of the light phase resulting from the cooling step, in the absence of filter aids.

Also proposed is an apparatus for purifying biodiesel, comprising some or all of: at least one washing vessel, for washing an incoming stream; at least one decanter, configured to split a stream into a heavy phase and a light phase; a filtration device for filtering a light phase produced by a final one of the at least one decanters, wherein the filtration device is configured to perform the filtration in the absence of filter aids. The apparatus can have no inlets, upstream of the filtration device, for adding additives to the light phase produced by the final one of the at least one decanters The present disclosure also proposes carrying out a process of wet washing of biodiesel without using a filter aid. After contact with a stream of dilute acid, an ester-rich stream goes through washing steps with stirring that is sufficiently intensive to remove the impurities, alternating with decanting steps for removing the dense phase from the stream. The resultant stream is submitted to a process of drying and then cooling, followed by filtration without the use of a filter aid. The biodiesel thus generated (so-called specified biodiesel) is suitable for the specifications required by the current regulations after using additives.

The disclosure can be applied according to two aspects: using an amount of water similar to that employed in the technology of Crown Technologies in a third washing of the product in specific conditions, or using an amount of water less than that employed in the technology of Crown Technologies, but adding a certain amount of a stream with dilute glycerol, which may be produced in the plant. The two directions are innovative in that they contain steps such as cold washing, cold decanting, intensive stirring, ideal residence time, and a more suitable process configuration for removal of impurities, which were not used in the prior art, bringing a saving in the amount of water used and minimizing the number of process steps.

The disclosure provides a process for purifying biodiesel, characterized in that it comprises some or all of the following steps: a) addition of a stream of dilute acid (1) to a stream of biodiesel (2); b) operations of washing (3a) and (3b) and (3c), or (3d) and (3e) of the stream of biodiesel (2) followed by decanting (4a) and (4b) and (4c) or (4d) and (4e); c) separation of the dense phase (5) resulting from decanting (4a, 4b, 4c, 4d, 4e); d) drying (8) of the light phase resulting from decanting (4c) or (4e); e) cooling (9) of the light phase resulting from drying (8); f) filtration (10) of the light phase resulting from cooling (9); g) optional incorporation of additives (11) to the stream generated in the filtration (10), wherein the dense phase (5) generated after decanting (4b, 4c) or (4e) is recycled to the washing step (3a, 3b) or (3d), and wherein the filtration (10) is carried out in the absence of filter aids.

A further aspect of the disclosure provides that dilute hydrochloric acid is used in the stream of acid (1).

A further aspect of the disclosure provides that the washing operations (3a, 3b, 3c, 3d, 3e) are carried out with stirring above 700 rpm and at a temperature in the range from 50° C. to 60° C.

A further aspect of the disclosure provides that the washing operations (3a, 3b, 3c, 3d, 3e) are carried out with stirring above 800 rpm.

A further aspect of the disclosure provides that step (a) of addition of acid is carried out before the washing operations (3a) or (3d) only.

A further aspect of the disclosure provides that washing (3d) uses dilute glycerol (7), and has a residence time from 2 to 5 minutes.

A further aspect of the disclosure provides that the dilute glycerol (7) is produced in the actual plant of the biodiesel production process.

A further aspect of the disclosure provides that the light phase resulting from decanting (4b) is cooled to a temperature in the range between 20° C. and 40° C. before it enters the washing vessel (3c).

A further aspect of the disclosure provides that the light stream in washing (3c, 3e) is mixed with an amount of fresh water (6) in an amount in the range between 2% and 6% of the weight of the light stream, and remains in this vessel for a residence time in the range between 15 and 25 minutes.

A further aspect of the disclosure provides that the light phase resulting from decanting (4c, 4e) undergoes a process of drying (8) and subsequent cooling (9) to a temperature in the range from 15° C. to 25° C., and remains in this condition for a residence time between 3 and 14 hours.

These aims and other advantages will become clearer from the description given hereunder and the appended drawings.

BRIEF DESCRIPTION OF THE FIGURES

The detailed description presented hereunder refers to the appended figures, in which.

DETAILED DESCRIPTION OF THE INVENTION

The present disclosure relates to a process for purifying biodiesel. It can use a sequence of washing operations after the reaction section, including cold washing operations and, in one of the embodiments, it also uses washing with a stream of glycerol, which may be formed during the process. The washed product formed is then decanted. Stirring is preferably sufficiently intensive (above 700 rpm, preferably above 800 rpm) to assist in the transformation of the molecules of esterified steryl glycosides, in order to convert them to a chemical form that can be removed by the process.

In the context of the present disclosure, "feed" means the stream produced in a reaction section of the overall plant. The feed (so-called unspecified biodiesel) consists of a mixture of compounds rich in esters, preferably methyl esters, obtained from oils of vegetable origin (preferably soya oil and palm oil), and also contains various other substances in small amounts.

Figure 1:
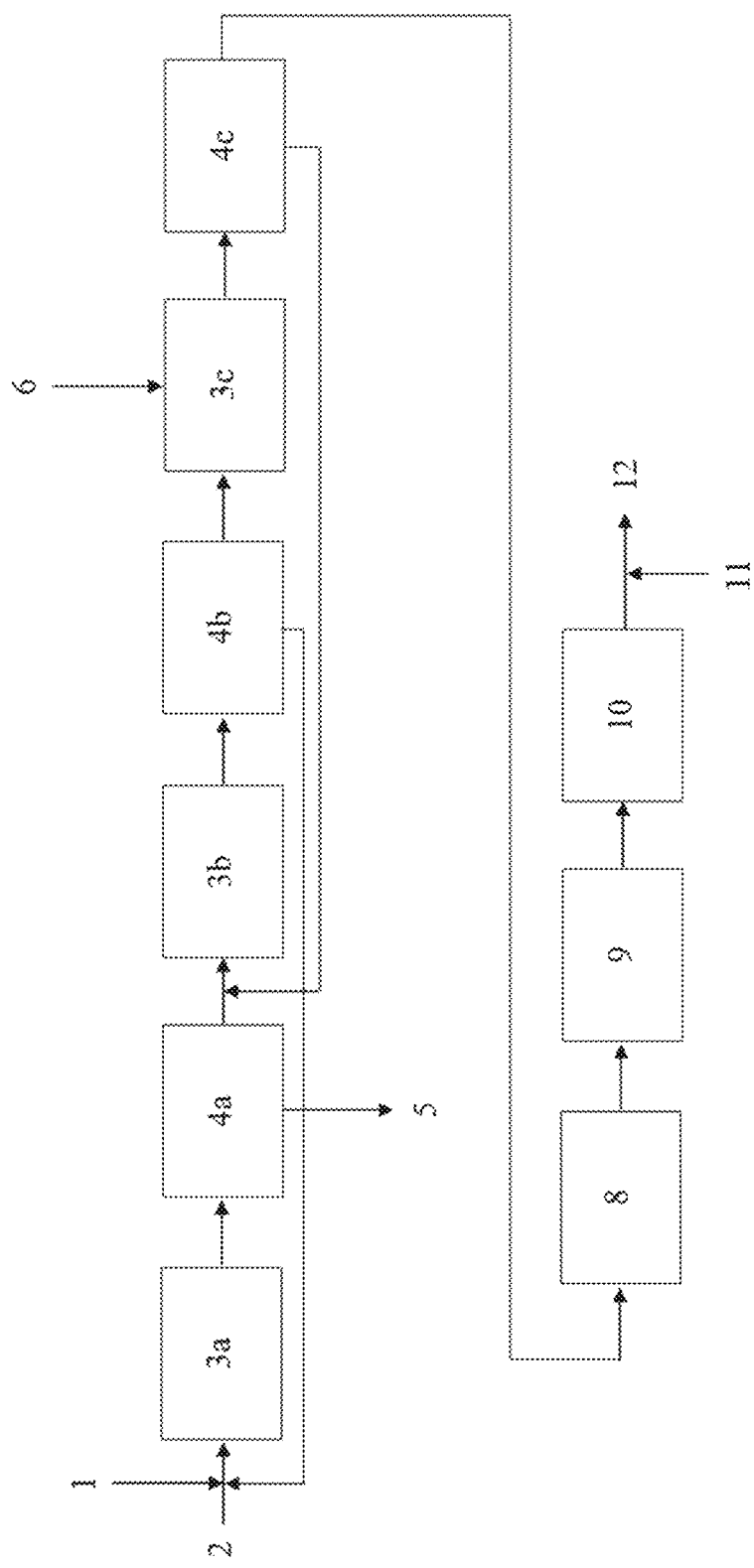
FIG. 1 shows a proposed configuration for a, called Process A.
Figure 2:
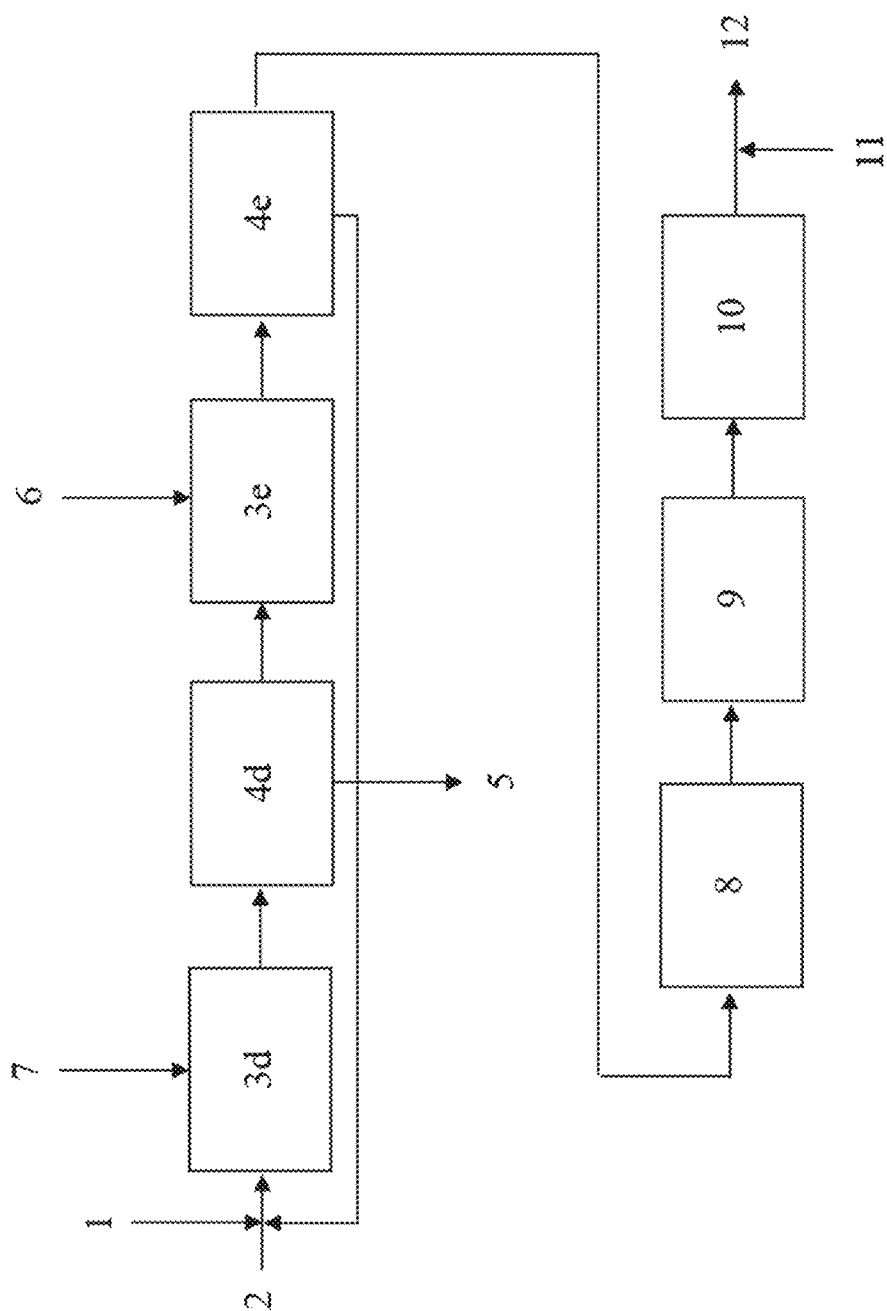
FIG. 2 shows another proposed configuration for a process, called Process B.
Figure 4:
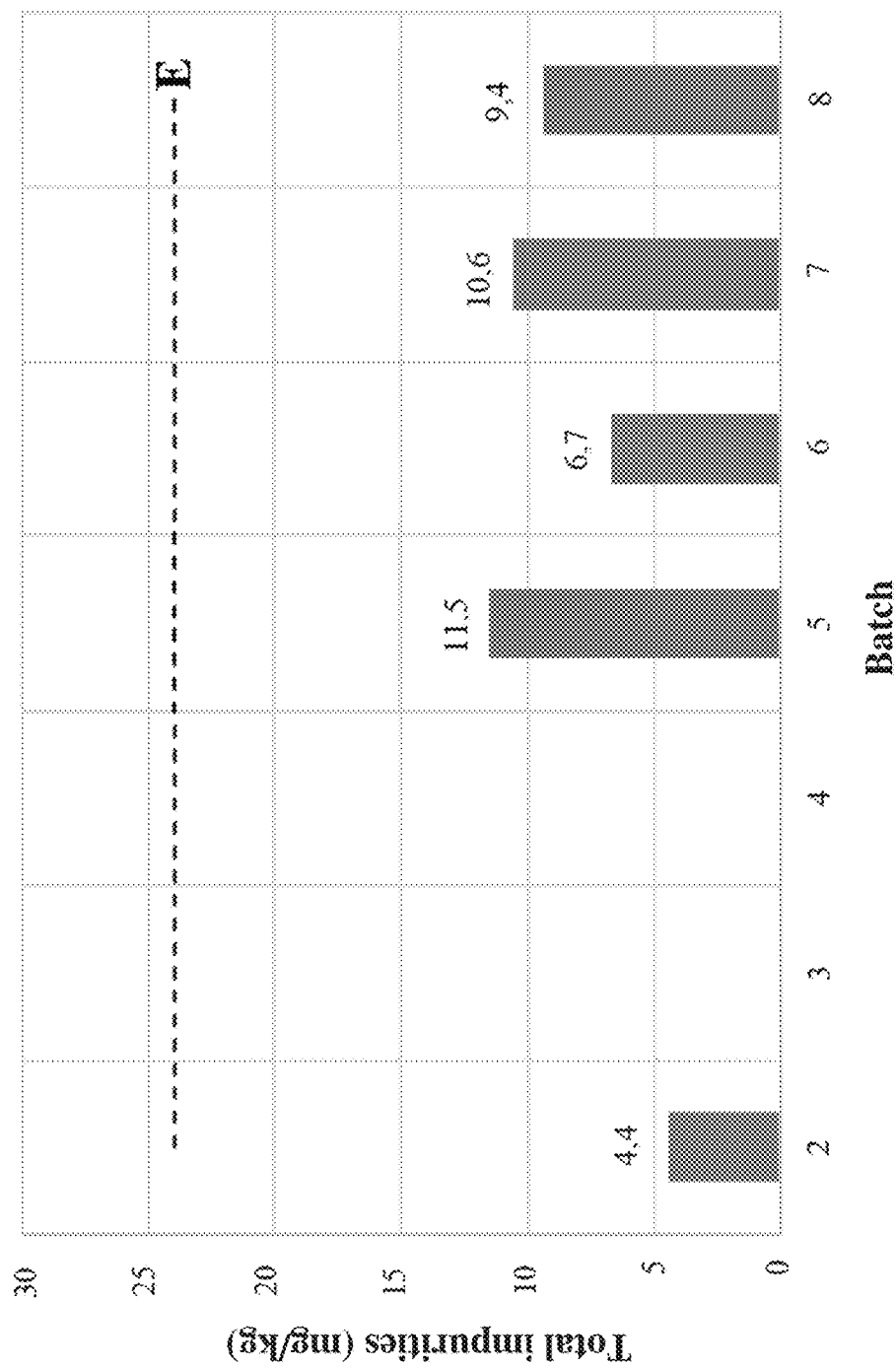
FIG. 4 shows an assessment of the configuration of Process B, as presented in Example 2 of the disclosure.

In general outline, the process for purifying biodiesel described by the present disclosure comprises the following steps:

a) addition of dilute acid 1 to a stream of biodiesel 2 (i.e. unspecified biodiesel);

b) operations of washing of the stream of biodiesel 2, as exemplified by operations 3a and 3b and 3c of FIG. 1, or operations 3d and 3e of FIG. 2, followed by decanting as exemplified by operations 4a and 4b and 4c of FIG. 1, or 4d and 4e of FIG. 2;

c) separation of the dense phase 5 resulting from decanting 4a, 4b, 4c, 4d, 4e;

d) drying 8 of the light phase resulting from decanting 4c, 4e;

e) cooling 9 of the light phase;

f) filtration 10 of the light phase;

g) optional incorporation of additives 11 in the stream generated in filtration 10 to produce the specified biodiesel 12, where the dense phase 5 generated after decanting from some steps, exemplified by operations 4b, 4c, 4e in FIGS. 1 and 2, is recycled to a washing step, exemplified by operations 3a, 3b, 3d in FIGS. 1 and 2, and filtration 10 is carried out in the absence of filter aids.

In a first example variant of the process (Process A, which is shown in FIG. 1), a stream of (unspecified) biodiesel 2 to be purified is received from the reaction section of a plant and enters a washing vessel 3a. As discussed below, washing vessel 3a, is able to receive the dense phase 5 generated after decanting 4b downstream of a further washing vessel 3b.

In this first washing step performed in first washing vessel 3a, a stream containing dilute acid 1, preferably hydrochloric acid, is added to neutralize any residual catalyst arising from the upstream biodiesel production process, and to assist in the purification of the biodiesel produced. In some embodiments, the residence time in this washing vessel 3a can be from 5 to 15 minutes. In some embodiments, a temperature from 50° C. to 60° C. can be desirable. In some embodiments, stirring above 700 rpm can be desirable, more preferably above 800 rpm.

After the first washing step in washing vessel 3a, the mixture proceeds to a (first) decanter 4a, where two new phases are separated from the incoming mixture. The light (i.e. less denser) phase of the two phases produced by the first decanter 4a proceeds to a (second) washing vessel 3b. The heavy (i.e. denser) phase produced by the first decanter 4a forms a stream 5 that leaves the process.

In this example, the second washing vessel 3b also receives the heavy (i.e. denser) phase generated after a third decanting step performed in third decanting vessel 4c downstream of a third washing vessel 3c, as discussed below. A second washing step is performed in the second washing vessel 3b. In some embodiments, it is desirable for the conditions in the second washing vessel 3b to be identical to those applied in washing vessel 3a, only differing by the absence of addition of acid and the use of washing water.

After washing vessel 3b, the mixture proceeds to a new, i.e. second, decanting vessel 4b. The second decanting vessel 4b splits the mixture into new light (i.e. less dense) and heavy (i.e. more dense) phases. The new light phase leaves from the second decanting vessel 4b, and proceeds to third washing vessel 3c. In some embodiments, it is desirable for this stream to be cooled to a temperature in the range between 20° C. and 40° C. before it enters the third washing vessel 3c. As mentioned above, the heavy phase from the second decanting vessel 4b is recycled upstream, and provided as an input to the first washing vessel 3a.

In a third washing step performed in washing vessel 3c, the in coming light stream is mixed with an amount of fresh water 6. In some embodiments, the amount of water is in the range between 2% and 6% of the weight of the light stream. In some embodiments intensive stirring (above 700 rpm, more preferably above 800 rpm) is applied. In some embodiments, residence time in the vessel is in range between 15 and 25 minutes.

On leaving the washing vessel 3c, the mixture proceeds to a third decanting step in a third decanter 4c. Once again, the decanter 4c produces two phases, a light (i.e. less dense) phase and a heavy (i.e. more dense) phase. As mentioned above receives the heavy phase generated by the third decanting step in third decanter 4c is recycled upstream to be an input to the second washing vessel 3b.

The light phase undergoes a process of drying in a dryer 8 and then a step of cooling in a cooler 9. In some embodiments the cooling is to a temperature in the range from 15° C. to 25° C., and the contents of the cooler 9 may remain in the vessel in this condition for a residence time between 3 and 14 hours, preferably between 3 and 6 hours.

After the cooling step, the stream proceeds to a filtration step performed in a filtration device 10, which is implement without the use of a filter aid (e.g. such as diatomaceous earth). As explained above in the purification of biodiesel the removal of water soluble contaminants is traditionally accomplished by water-washing the biodiesel. Another process of biodiesel purification traditionally involves the use of an "adsorbent filter-air" such as magnesium silicate, and in the case of polar impurities it is usual to use a diatomaceous filter, but such filter aids are not used in the process of the present disclosure. The output of the filtration step is a product that meets the specifications for biodiesel (so-called specified biodiesel) 12 usually after incorporation of additives 11, according to the Brazilian regulatory authority (Agência Nacional de Petróleo, Gás Natural e Biocombustíveis—National Agency for Petroleum, Natural Gas and Biofuels—ANP).

In a second example variant of the process (Process B, which is shown in FIG. 2), a stream 7 containing glycerol and water is also supplied for the first washing step performed in a first washing vessel 3d. Also supplied is a heavy (i.e. denser) phase generated after a second decanting step in a second decanter 4e downstream of second washing step performed in a second washing vessel 3e, which is discussed further below. The stream of glycerol 7 may be obtained by the union of the heavy (i.e. denser) phase obtained in the reaction section of the overall plant with the dense phase generated at the first washing step performed in first washing vessel 4d (discussed in more detail below), which can be rectified to remove the alcohol used in the production of biodiesel, and can be recycled to transesterification reactors, for example.

Therefore the light phase 2 received from the reaction section enters the first washing vessel 3d, where it will be able to receive the heavy (i.e. denser) phase generated after the second decanting step performed the second decanting vessel 4e downstream of the second washing step performed in the second washing vessel 3e, and receive the glycerol stream 7. In some embodiments, the glycerol stream 7 is preferably in the form of 50 wt % of a bottom stream of a methanol rectification tower, of a conventional biodiesel production. The methanol rectification tower is used in conventional biodiesel production to recover the glycerine and the excess of methanol used in the transesterification reaction.

In this first washing step performed in first washing vessel 3d, a stream containing dilute acid 1, preferably hydrochloric acid, is added to neutralize the residual catalyst arising from the biodiesel production process and to assist in purification of the resultant biodiesel. In some embodiments, the residence time in the first washing vessel 3d is preferably from 2 to 5 minutes. In some embodiments, a temperature in the range between 50° C. and 60° C. is desirable. In some embodiments, stirring above 700 rpm is desirable, more preferably above 800 rpm.

After the first washing step performed in the first washing vessel 3d, the mixture proceeds to the first decanting step performed in first decanting vessel 4d. The first decanting vessel 4d produces two phases as output streams, a light (i.e. less dense) phase and heavy (i.e. more dense) phase. The heavy phase forms a stream 5 that leaves the process.

The light phase produced in the first decanting step leaves the first decanting vessel 4d and proceeds to a second washing vessel 3e. In some embodiments, for a second washing step performed in second washing vessel 3e, it is desirable for the conditions to be identical to those applied in the first washing vessel 3d, only differing by the absence of addition of acid. In this second washing step performed in the second washing vessel 3e, the light phase stream received from the first decanting vessel 4d is mixed with an amount of fresh water 6. In some embodiments the amount of water is in the range between 2% and 6% of the weight of the light phase stream. In some embodiments it is desirable to have with intensive stirring (above 700 rpm, more preferably above 800 rpm). In some embodiments it is desirable for the residence time in the second washing vessel 3e to be in the range from 2 to 5 minutes.

On leaving the second washing vessel 3e, the mixture proceeds to a second decanting step in in second decanting vessel 4e. In the second decanting vessel 4e separation of the mixture into two phases is performed. As mentioned above, the heavy (i.e. denser) phase is recycled upstream and used as an input to the first washing vessel 3d.

The light (i.e. less dense) phase obtained from the second decanting vessel 4e undergoes a process of drying in a dryer 8 and cooling in a cooler 9. In some embodiments the cooling is to a temperature in the range from 15° C. to 25° C. In some embodiments, the mixture remains in the cooling vessel 9 for a residence time between 3 and 14 hours, preferably between 3 and 6 hours. From the cooler 9, the mixture proceeds to a filtration step at a filter 10. The filtration step is preferably performed without the use of filter aid. The resulting product, output from the filter 10 meets the specifications for biodiesel 12, usually after incorporation of additives 11, according to the Brazilian regulatory authority (ANP).

In this second example variant, an amount of water is used that is less than that used in the technology from Crown Technologies. Also, the stream 7 with dilute glycerol, when produced in the plant itself and added to the process, brings economies in the amount of water used and minimizes the number of process steps.

In a further refining section (i.e. steps carried out after drying of the biodiesel, i.e. after the cooling and filtration steps, and after the additives are added), the stream of dry biodiesel can be cooled to a temperature in the range from 15° C. to 25° C., as discussed above. The stream can remain in a vessel in this condition for a residence time between 3 and 14 hours, preferably between 3 and 6 hours. From there it can proceed to a pre-filtration step, preferably in bag filters. After this pre-filtration, the stream of biodiesel may be cooled again to a temperature in the range from 15° C. to 25° C. The stream can remain in a vessel in this condition for a residence time between 4 and 14 hours. From there it may proceed to filtration on a filter of the high-flow pleated polypropylene cartridge type (with absolute degree of filtration of 10 µm). That can be followed by filtration on a high-efficiency cartridge filter consisting of cellulose and inorganic filter aids (with absolute degree of filtration of 1 µm, in some embodiments). Alternatively, the stream of dry biodiesel may only be cooled to a temperature in the range between 25° C. and 50° C., and then proceed to a step of pre-filtration in bag filters and to a filtration step in a filter of the high-flow pleated polypropylene cartridge type, followed by filtration in a high-efficiency cartridge filter consisting of cellulose and inorganic filter aids.

In plants that use the technology from Crown Technologies, it is more feasible to implement Process A, without the need to recycle the glycerol, since the glycerols generated in these units already meet the specification for light glycerol, and therefore, despite being a product with commercial value, it may not be effective for removing impurities from the stream tested.

The description that follows is based on preferred embodiments of the invention. As will be obvious to person skilled in the art, the invention is not limited to these particular embodiments.

EXAMPLES

To illustrate the greater efficiency of the process disclosed here, sequential batch reactions were carried out using recycling of the dense phases to simulate countercurrent washing and, when applicable, partial recycling of the dilute glycerol.

Example 1—Process A

The process configuration assessed consists of a purification section for biodiesel derived from soya oil, containing three steps of water washing in countercurrent. The oil used for producing the biodiesel was supplied by the Usina de Biodiesel de Montes Claros [Montes Claros Biodiesel Plant], after undergoing the industrial-scale pretreatment steps. In this configuration, the dense phase resulting from second decanting vessel 4b is used in the first washing step performed in vessel 3a and the dense phase resulting from the third decanting vessel 4c is used in the second washing step performed in washing vessel 3b, whereas only pure water 6 is employed in the third washing step performed in vessel 3c. In the first washing vessel 3a, the temperature is in the range from 50° C. to 60° C., with continuous, intensive stirring (above 800 rpm) throughout this step, with a residence time between 5 and 15 minutes. In the second washing vessel 3b, the conditions of the first washing vessel are repeated, apart from absence of the acid. The third washing vessel 3c uses 4% of water relative to the weight of light phase resulting from second decanting vessel 4b, and intensive stirring (above 800 rpm) continues for a residence time between 15 and 25 minutes, at a temperature in the range from 20° C. to 40° C. The light stream generated in the third decanting vessel 4c proceeds to a step of drying 8 and cooling 9, remaining at a temperature in the range between 15° C. and 25° C. for 5 hours before undergoing the filtration step 10 in the absence of a filter aid.

Figure 3:
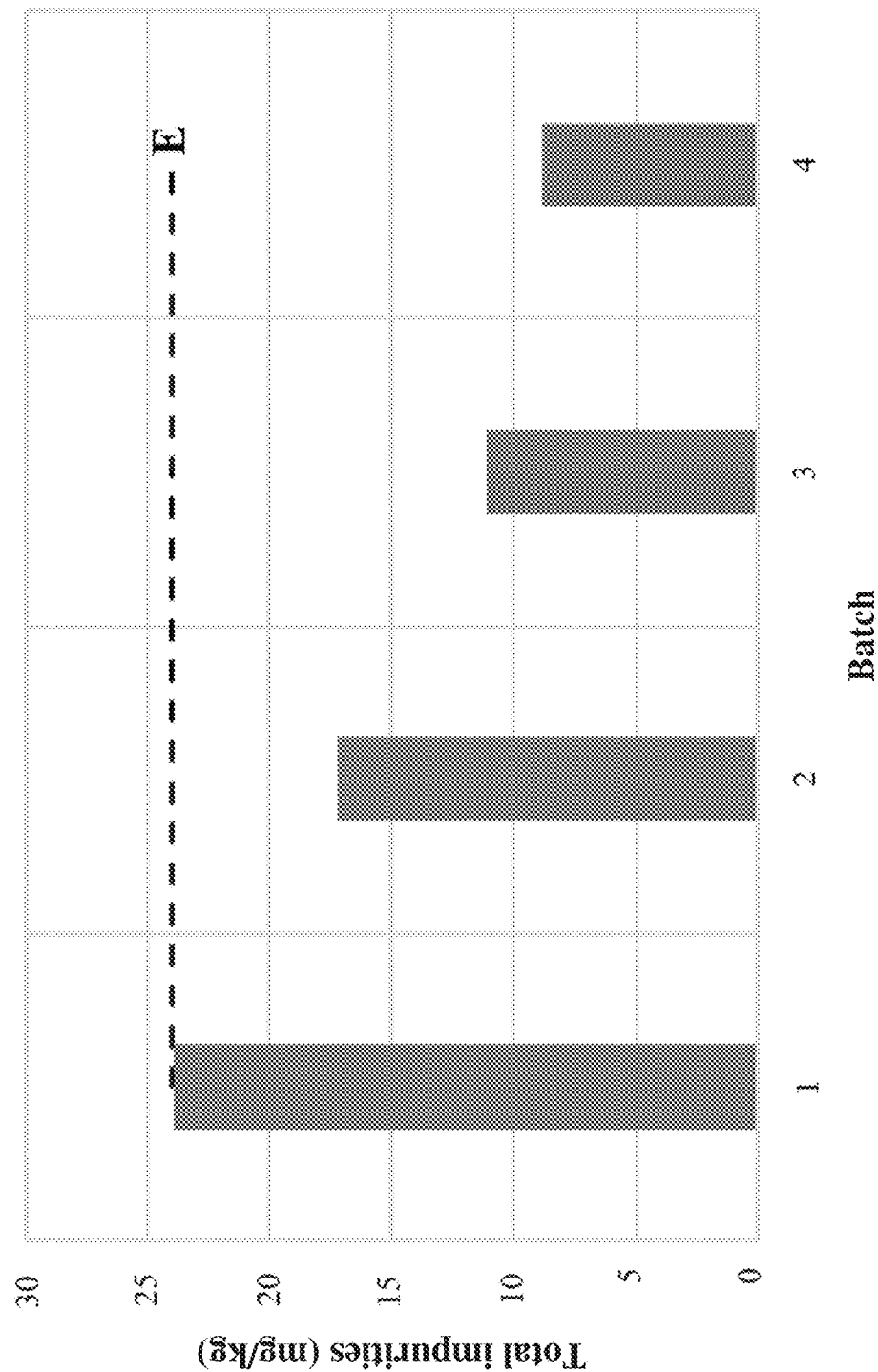
FIG. 3 shows an assessment of the configuration of Process A, as presented in Example 1 of the disclosure.

In all, four sequential batches were carried out, using recycling of the dense phases to simulate countercurrent washing. The results are presented in FIG. 3. It can be seen that the values of contamination of all the products are below what is stipulated in the specification E (maximum impurities of 24 mg/kg of biodiesel, represented by the dotted line in the diagram). Furthermore, on progressing to equilibrium of the composition of the recycling streams, the contamination values decrease.

Example 2—Process B

The process configuration assessed consists of a purification section for biodiesel derived from food-grade soya oil, containing two steps of water washing in countercurrent. In this configuration, dilute glycerol 7, received from the bottom of a methanol tower used in the production of the biodiesel, is mixed with the aqueous phase resulting from second decanting vessel 4e, and the mixture is used in the first washing step performed in washing vessel 3d, whereas only pure water 6 is used in the second washing step performed in washing vessel 3e. In the first washing vessel 3d, the temperature is in the range from 50° C. to 60° C., with continuous, intensive stirring (above 800 rpm) throughout this step, which takes between 2 and 5 min. The second washing step performed in the second washing vessel 3e uses 3% of water relative to the weight of light phase resulting from washing 3d, and intensive stirring (above 800 rpm) continues for a time of between 2 and 5 minutes, and with a temperature in the range from 50° C. to 60° C. The light stream generated in the second decanting vessel 4e proceeds to a step of drying 8 and cooling 9, remaining at a temperature between 15° C. and 25° C. for 5 hours before being filtered without using a filter aid.

In all, eight sequential batches were carried out, using recycling of the dense phases to simulate countercurrent washing and partial recycling of the dilute glycerol. The first batch used only water in first washing vessel 3d, as the first streams of dilute glycerol 7 and dense phase 5 had not yet been generated. Besides this, it was considered to be unnecessary to determine the total contamination of the products from batches 3 and 4, since these batches had not reached equilibrium. The results starting from the fifth and up to the eighth batches, together with the second as reference of the initial, non-equilibrium state, are presented in FIG. 4. All the products from this sequence had contamination values below the limit E (maximum impurities of 24 mg/kg of biodiesel, represented by the dotted line in the diagram) required by the specification of the Brazilian regulatory authority (ANP) for B100, confirming that the process configuration, in the conditions employed, reduces the concentration of impurities to acceptable values. Despite the small variations in the contamination result, the mean value and standard deviation were 10.5 mg/kg and 3.2 mg/kg respectively, which means it is safe to state that the concentration of impurities meets the requirement (max. 24 mg/kg).

The description made thus far of the subject matter of the present invention must only be regarded as a possible embodiment or possible embodiments, and any particular features introduced therein are only to be understood as something that has been written to facilitate understanding. Modification of the above-described apparatuses and methods, combinations between different variations as practicable, and variations of aspects of the invention that are obvious to those of skill in the art are intended to be within the spirit and scope of the claims.

What is claimed is:

1. A process for purifying biodiesel, comprising the following steps:
   a) operations of washing of a stream of biodiesel followed by decanting; and
   b) filtration of a light phase resulting from a decanting operation, wherein the filtration is carried out in the absence of filter aids; and
   wherein a first washing operation uses dilute glycerol, and has a residence time from 2 to 5 minutes.

2. The process for purifying biodiesel according to claim 1, further comprising addition of a stream of dilute acid to the stream of biodiesel.

3. The process for purifying biodiesel according to claim 2, wherein dilute hydrochloric acid is used in the stream of dilute acid.

4. The process for purifying biodiesel according to claim 1, wherein the washing operation is carried out with stirring above 700 rpm and at a temperature in the range from 50° C. to 60° C.

5. The process for purifying biodiesel according to claim 4, wherein the washing operation is carried out with stirring above 800 rpm.

6. The process for purifying biodiesel according to claim 2, wherein the step of addition of acid is carried out before a first washing operation only.

7. The process for purifying biodiesel according to claim 1, wherein the dilute glycerol is produced in the actual plant of the biodiesel production process.

8. The process for purifying biodiesel according to claim 1 characterized in that a light phase resulting from a decanting operations is cooled to a temperature in the range between 20° C. and 40° C. before it enters a further washing operation.

9. The process for purifying biodiesel according to claim 1, wherein a washing operation includes mixing an incoming stream with fresh water in an amount in the range between 2% and 6% of the weight of the light stream, and for a residence time in the range between 15 and 25 minutes.

10. The process for purifying biodiesel according to claim 1, wherein, before filtration of the light phase resulting from decanting, the light phase undergoes a process of drying and subsequent cooling to a temperature in the range from 15° C. to 25° C., and remains in this condition for a residence time between 3 and 14 hours.

11. The process for purifying biodiesel according to claim 1, wherein the filtration is carried out after the decanting operation and before any further additives are added to the light phase resulting from the decanting operation.

12. A process for purifying biodiesel, comprising the following steps:
   a) addition of a stream of dilute acid to a stream of biodiesel;
   b) an operation of washing of the stream of biodiesel followed by a first decanting operation, and further taking the light phase resulting from the first decanting operation and performing further washing and decanting operations;
   c) collecting dense phases resulting from the decanting operations, and recycling at least one dense phase to one of the washing operations;
   d) drying of the light phase resulting a final decanting operation;
   e) cooling of the light phase resulting from the drying step;
   f) filtration of the light phase resulting from the cooling step, in the absence of filter aids.

13. The process for purifying biodiesel according to claim 12, further comprising incorporation of additives to the product stream generated in the filtration.

* * * * *